United States Patent

Koller et al.

[11] 3,755,913
[45] Sept. 4, 1973

[54] PROCESS AND APPARATUS FOR CONTINUOUS TREATMENT OF DUSTY, POWDERY AND GRANULAR MATERIALS

[75] Inventors: Hans Koller; Urs Frey-Portner, both of Muttenz, Switzerland

[73] Assignee: Buss A.G., Basel, Switzerland

[22] Filed: Nov. 12, 1971

[21] Appl. No.: 198,376

[30] Foreign Application Priority Data
Nov. 16, 1970 Austria.............................. A 10313

[52] U.S. Cl. ..................................... 34/10, 34/57 E
[51] Int. Cl............................................. F26b 17/10
[58] Field of Search ................... 34/10, 57 R, 57 E; 263/21 A; 55/261, 410, 428, 414; 432/15, 58

[56] References Cited
UNITED STATES PATENTS
2,363,281  11/1944  Arnold............................ 34/57 E X FOREIGN PATENTS OR APPLICATIONS
114,810  9/1945  Sweden................................. 34/10

Primary Examiner—William F. O'Dea
Assistant Examiner—William C. Anderson
Attorney—Abraham A. Saffitz

[57] ABSTRACT

A process for continuously drying dusty, powdery and granular materials by means of the sensible heat of gas serving simultaneously as the heating medium and the carrier gas for the materials to be treated. A gas stream containing the material to be treated is introduced tangentially into a circular path of motion and the stream so introduced moves a number of revolutions in this path to create a revolving ring of particles. The revolving ring of particles if formed while the gas is continuously drawn off below the inlet level of the gas stream with the formation of a potential vortex sink. The untreated particles flowing in from the outside displace the already revolving particles until the revolving particles, after progressive treatment, are picked up by the suction of the exiting gas stream which carries them out of the circular path. The apparatus for carrying out this proces comprises a treating chamber in the form of a ring chamber with an inlet which opens up tangentially to an outer wall of the chamber and an outlet in the form of a container which is arranged axially and at least partially under the bottom of the ring chamber, the container having a tangential takeoff duct. The ring chamber is provided with a bottom which has a slightly rising radial slope toward the center of the ring chamber. The process and apparatus may also be used for cooling the materials and for reactions carried out by exchange between gaseous and solid-phase materials.

2 Claims, 4 Drawing Figures

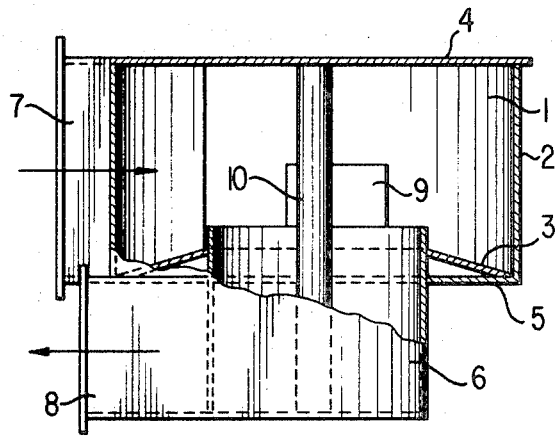
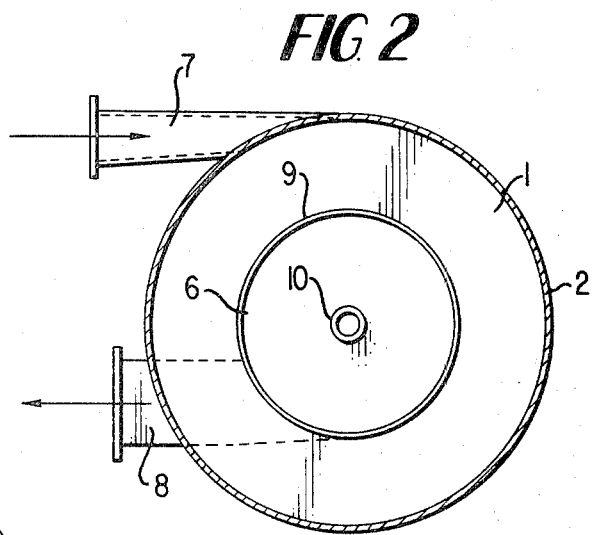
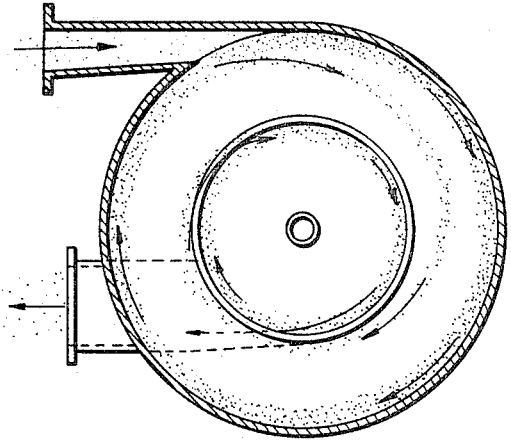
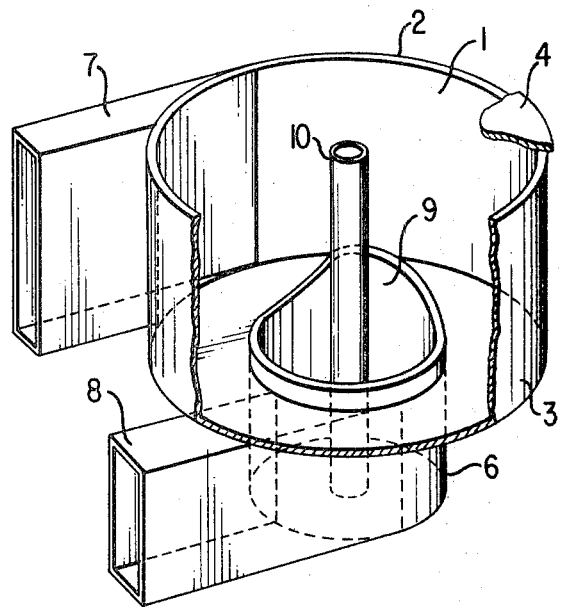

PROCESS AND APPARATUS FOR CONTINUOUS TREATMENT OF DUSTY, POWDERY AND GRANULAR MATERIALS

The present invention relates to a process for continuously drying dusty, powdery and granular materials by means of the sensible heat of a gas serving simultaneously as the heating medium and the carrier, by which the gas stream bearing the material to be treated is introduced tangentially into a circular path and the gas stream bearing the treated material is drawn off axially, as well as an apparatus for carrying out this process.

In continuously operated drying processes, it is possible to move the material to be dried and the drying agent during the drying process by the commonly-known uni-directional current principle. The main advantage of this known principle is that the temperature of the product removed from the dryer is relatively low since the product is surrounded by the already cooled-down drying agent. However, this limits the maximum reduction in final moisture content which can be achieved. Thus, it has been necessary to build very large drying installations in order to obtain a sufficient residence time of the product to be dried, particularly in cases where requirements for final moisture content are demanding, and in some cases, two or more dryers have had to be connected in series.

These commonly-known stream dryers require long flow piping and therefore require a high space for moderate efficiency, and they are difficult to clean. The known fluid-bed and spouting-bed dryers also require a great deal of space, high energy consumption and relatively high investment cost; and they are also difficult to clean. In addition, the arrangement of a number of these dryers in series results in unavoidable pressure drops which impair the economics of maintenance and operation still further.

It is the object of the present invention to provide a continuous drying process and an apparatus therefor which avoids the above disadvantages. The process according to the invention is characterized by the fact that the gas, after a number of revolutions in the circular path, is drawn off below the inlet level with the formation of a potential vortex sink, while a revolving ring of particles is formed by the material particles to be treated, whereby the new particles flowing in from the outside displace the already revolving particles until the latter, after progressive drying, are picked up by suction and carried out.

The apparatus for carrying out this process comprises a turbulence chamber with an inlet and an outlet opening, the chamber being arranged as a ring chamber, having a bottom which has a slightly rising radial slope toward the center, and having the inlet opening tangentially into the outer wall of the turbulence chamber, while the outlet is formed as a cylindrical container with a tangential offtake duct and is arranged coaxially with the chamber under its bottom.

The accompanying drawings show diagrammatically a preferred embodiment of the apparatus of the invention which is used to carry out the process, described below. The drawings show:

In FIG. 1, a cross-section;

In FIG. 2, an axial section;

In FIG. 3, a further axial section illustrating the flow process; and

In FIG. 4, a perspective view, partially cut.

The dryer comprises a cylindrical chamber 1 which is bound by a barrel-shaped outer wall 2. The upper closure consists of a cover 4 which may be screwed on with a gasket (not illustrated) or may be fastened otherwise to be easily dismantled. The bottom of the chamber 1 consists of a circular ring-shaped closure piece 5 in which a cylindrical container 6 is mounted. This container 6 extends a certain distance into the chamber 1 and is surrounded by a bottom plate 3 set into the chamber. This bottom plate 3 has the shape of a flat truncated cone and rises slightly toward the center, i.e., toward the container 6.

An inlet connection opens tangentially into the outer wall 2, whereby its cross-section narrows down to the opening section of this connection. The offtake duct 8 is connected to the container 6 tangentially and is located beneath the chamber 1. A shield plate 9 is provided which is formed by an extension of the cylindrical wall of the container 6 and which extends over about 45° of its circumference. It is so arranged that it lies in the area of the opening point of the inlet 7 and reaches to about one-fourth the height of the chamber 1. A closed tube 10 rests against the cover 4 and against the bottom of the container 6, and is arranged centrally within the chamber 1.

It is preferred that the bottom plate 3 be formed as a replaceable insert so that it can be replaced in short order. Also, the outer wall 2 can be protected by a liner formed as a replaceable insert. It is further contemplated that the chamber 1 be surrounded with a jacket inside of which a cooling or heating medium can circulate.

It is also contemplated that the present apparatus may be supplemented with a cyclone separator. In addition, it is often advantageous to provide supplementary air nozzles in the area of the inlet connection 7 and to provide the outer wall at its lower end with inwardly projecting baffles to aid turbulence.

The process is as follows:

The gas, bearing moist material particles, is introduced into the inlet 7 under pressure. The shape of the inlet connection causes the velocity of the gas and of the material particles to be increased. Upon entry into the chamber 1, the stream of gas is diverted into a circular path, whereby the heavy, moist material particles maintain their high speed because of inertia, and the particles will seek the greatest possible radius for their orbiting path as a result of the operation of the centrifugal force. During their whirling, revolving motion, the moist particles enter into heat exchange with the hot carrier gas, thus drying and becoming lighter as a result. The new wet heavy particles which are continuously flowing in circulate in the outer path of greater radius and are dried. The orbiting path of the dried particles shifts closer to the center. The carrier gas is drawn off in the center of the chamber 1 through the vortex sink in the container 6, so that a relatively weak radial flow is set up in the chamber. The dry, light particles in the path close to the center are picked up by this flow and are drawn into the vortex sink by the suction, where they are picked up by the carrier gas and discharged through the outlet 8. The eye of the vortex is effectively suppressed by the closed tube 10 and the vortex is interrupted and limited in height by the outward slope of the plate 3 as well as the collar between plate 3 and wall extension 6 with its shield 9. The larger particles, which contain more moisture and dry more slowly, offer more resistance to being displaced to paths closer to the center and so remain longer in outer paths, but as soon as they have lost their moisture, they pass out through the vortex sink.

The result is that the larger particles exhibit a residence time in the drying chamber which is prolonged proportionally to that of the smaller particles which dry immediately.

Since there is an initial partial separation of product out of the carrier gas without the separated product being discharged, the particle concentration is increased in the ring stream in relation to apparatus volume. This means that more product surface area is available to the carrier gas for exchange of heat and material.

A particular advantage of the new solution is that output per unit volume is considerably higher and that heat losses are lower because of the smaller apparatus surface. The easily dismantled cover makes cleaning extremely easy and rapid. Apart from this, the outlet 8 is formed in such a way that it works as a diffuser, and part of the energy of flow is recovered. The pressure drop is therefore up to 40 percent less than in known devices and this makes it possible to connect a number of the pieces of apparatus described herein in series, when necessary.

The above-described process and apparatus are suitable for the drying of the most varied chemicals, foodstuffs, synthetic resins and granulates of every kind. They can also be used exclusively for after-drying, whereby heavy particles requiring longer treatment times as a result of their greater mass per unit of surface area are retained correspondingly longer in the turbulence chamber than smaller particles. Furthermore, tests have shown that, for certain products, the particle size becomes more uniform.

It has been demonstrated that the new process exhibits analogous advantages in cases where only cooling is required, or where reactions are carried out by exchange between gaseous and solid-phase materials.

For example, when granules are cooled in cold carrier gas, the larger granules remain for a longer period in their whirling orbit, since they possess a greater mass moment of inertia. The smaller granules, which are also those which cool down faster, are picked up earlier by the suction of the vortex sink, since they lose their motion energy. In this way, advantageous residence-time conditions are produced in the apparatus, because the particles requiring longer treatment do actually remain in the treating chamber for a long time.

It is to be noted that, because of the factors of residence-time of the particles in the circular path for a number of orbits before the particles are removed by suction at the outlet and the longer residence-time for the larger particles, the concentration of particles in the circular path is substantially greater than the concentration of particles in the inlet stream or in the outlet stream.

Although the obvious applications for the process and apparatus of the invention are for drying, cooling or heating solid particles with a carrier gas, the process is also advantageously carried out for condensation polymerization wherein the monomer unit in a solid-phase particle is heated by a gas in order to eliminate a gas such as water or ammonia in conversion from the monomer state to the polycondensate polymer state. This polycondensation accompanied by evolution of water vapor or ammonia occurs in conversion of solid nylon salt to solid nylon condensate and in polyesterification in the solid-phase, these being with or without solid catalyst in accordance with well-known procedures.

What is claimed is:

1. A process for continuous treatment of dusty, powdery and granular particulate materials, said treatment being for drying, cooling or chemical reaction between the gas and solid phase, by means of the sensible heat of a gas serving simultaneously as the temperature conditioning medium and as the carrier, comprising:

introducing a gas stream at the inlet for said material which bears the wet material to be treated tangentially into a circular path in which the particles move in a revolving ring which lies in the plane of said inlet;

drawing off the gas stream axially from said revolving ring at the outlet, which lies in a plane below said outlet, said stream undergoing a plurality of revolutions in said circular path before it is drawn off in the outlet location which is below the inlet, while the incoming stream continues the circular movement;

said circular movement in the treating chamber forming a vortex sink below the inlet and adjacent the outlet, the new wet particles flowing into the process displacing the dried particles which, after progressive treatment are drawn into weak radial flow into the center of the vortex sink and are thereafter removed;

the newly introduced wet particles and the partially dry particles moving in circular paths having different radii with a dead spot created in the vortex by shaping the center with a closed tube and the sides by the outward slope of the bottom of the container and by the extension of the walls of the container;

the concentration of wet and partially dry particles moving in the circular paths being greater than the concentration of particles in the incoming stream fed into the inlet and in the outgoing stream which exits from the outlet; and removing the particles at the outlet by virtue of suction created thereat.

2. Apparatus for the continuous treatment of dusty, powdery and granular materials comprising:

a treating chamber with an inlet and an outlet;

said treating chamber being formed as a ring chamber with a cover and having a bottom which has a slightly rising radial slope toward the center, a tubular mounting means which rests against the cover and is located in the center of the treating chamber;

said inlet opening out tangentially into the outer wall of the treating chamber, whereby the entering gas stream moves into a circular orbit within said treating chamber;

said outlet being formed as a container with a tangential takeoff duct through which the particles treated in the orbit exit in a stream from the treating chamber;

a part of the wall of said central container being extended into the treating chamber and forming a shield in the opening area of said inlet;

said takeoff duct providing a low pressure drop and providing diffusing means which forms a vortex sink;

said container being arranged axially in the center under the bottom of the treating chamber and being supported about said central tubular mounting means which extends to the bottom of said outlet container;

said bottom having a slightly rising radial slope toward the center to assist the upward movement of wet particles, and said takeoff duct projecting from the outer periphery of said treating chamber.

* * * * *